United States Patent [19]

Stielau et al.

[11] Patent Number: 5,399,046
[45] Date of Patent: Mar. 21, 1995

[54] MEMBER JOINT

[75] Inventors: Wilfried Stielau, Ingolstadt; Gundolf Kreis, Oberstimm; Klaus P. Rinke, Wettstetten; Heinrich Timm, Ingolstadt, all of Germany

[73] Assignee: Audi A.G., Ingolstadt, Germany

[21] Appl. No.: 78,181

[22] PCT Filed: Dec. 19, 1991

[86] PCT No.: PCT/EP91/02457
§ 371 Date: Jun. 16, 1993
§ 102(e) Date: Jun. 16, 1993

[87] PCT Pub. No.: WO92/11168
PCT Pub. Date: Jul. 9, 1992

[30] Foreign Application Priority Data

Dec. 20, 1990 [DE] Germany ............... 40 40 982.1

[51] Int. Cl.$^6$ ............... B62D 25/00; B62D 29/00
[52] U.S. Cl. ............... 403/383; 403/344; 403/271; 403/13
[58] Field of Search ............... 296/204, 203, 194, 29, 296/30, 188, 189; 403/383, 344, 289, 13, 14, 217, 169, 271, 265

[56] References Cited

U.S. PATENT DOCUMENTS

| | | | |
|---|---|---|---|
| 2,676,025 | 4/1954 | Davis | 403/344 |
| 4,043,854 | 8/1977 | LeNoane et al. | 403/14 |
| 4,466,653 | 8/1984 | Harasaki . | |
| 4,573,734 | 3/1986 | Gass . | |
| 4,660,345 | 4/1987 | Browning . | |
| 4,669,777 | 6/1987 | Harasaki et al. . | |
| 4,712,829 | 12/1987 | Hurten et al. . | |
| 4,900,082 | 2/1990 | Schwuchow et al. . | |
| 4,919,474 | 4/1990 | Adachi et al. . | |

FOREIGN PATENT DOCUMENTS

| | | |
|---|---|---|
| 0146716 | 7/1985 | European Pat. Off. . |
| 775182 | 12/1934 | France . |
| 879519 | 10/1952 | Germany . |
| 2120565 | 11/1972 | Germany . |
| 3811427 | 10/1989 | Germany . |
| 3918283 | 5/1990 | Germany . |
| 0454942 | 11/1991 | Germany . |
| 432130 | 7/1935 | United Kingdom . |
| WO92/11165 | 7/1992 | WIPO ............... 296/188 |
| WO92/22454 | 12/1992 | WIPO ............... 296/188 |

Primary Examiner—Randolph A. Reese
Assistant Examiner—Anthony Knight
Attorney, Agent, or Firm—Jacques M. Dulin

[57] ABSTRACT

A longitudinal bearer joint assembly for joining the abutting ends of two axially aligned, extruded light-metal bearer members of a front end longitudinal bearer assembly in a passenger car bodywork. The two bearer members are designed with different cross sectional profiles and wall thickness dimensions to favorably control deformation of the front end longitudinal bearer assembly. The bearer joint assembly includes a pair of half shell portions which surround and conform to the abutting ends of the two axially-aligned bearer members. The half shell portions include vertical contact surfaces which are mutually offset about a neutral axis in a vertical plane.

17 Claims, 1 Drawing Sheet

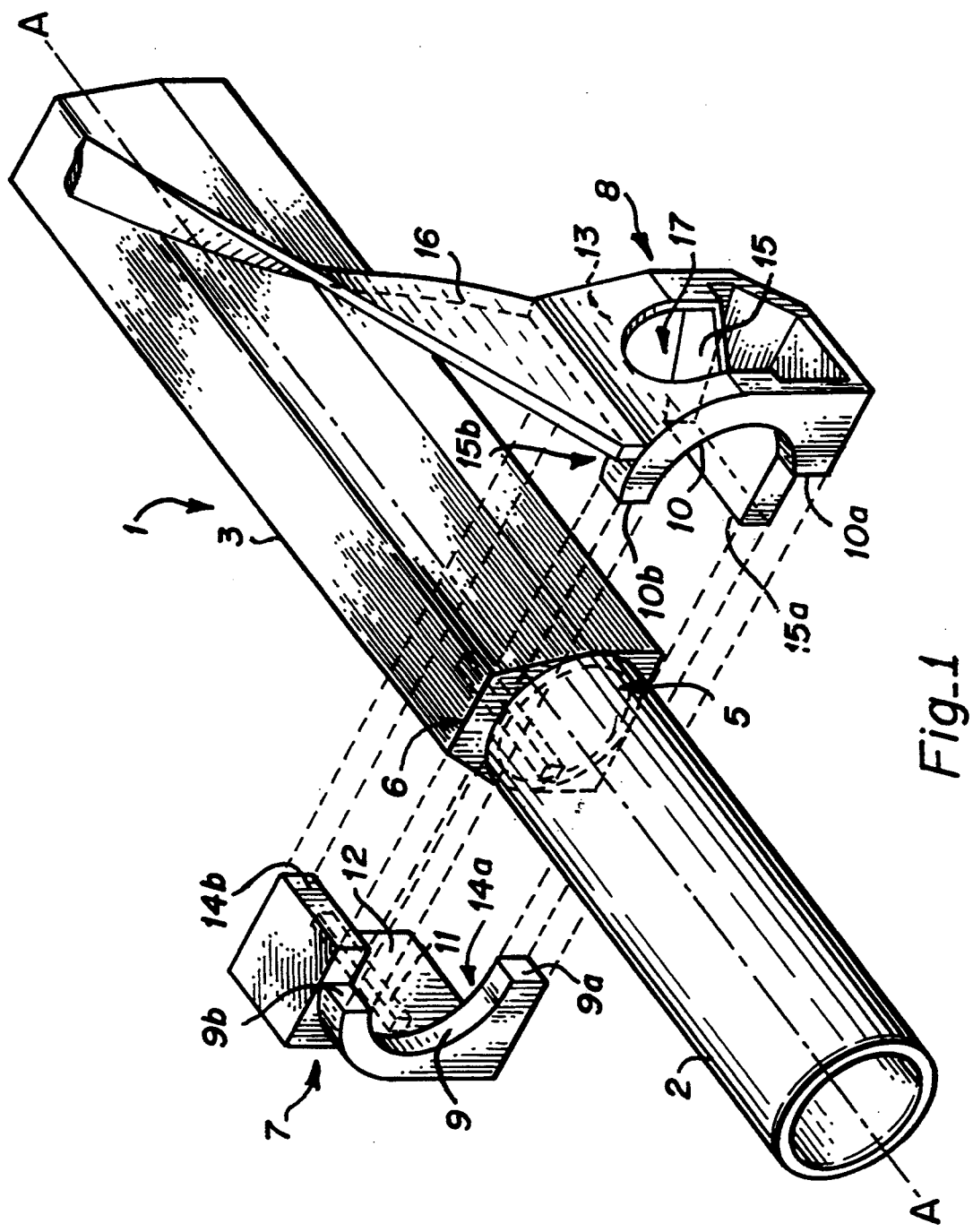
Fig_1

MEMBER JOINT

FIELD

The present invention relates to a joint assembly for connecting frame members in a motor vehicle bodywork, and more particularly to a bearer joint assembly for connecting a pair of axially aligned longitudinal bearers in a front end bearer assembly of a motor vehicle bodywork.

BACKGROUND

Customary self-supporting vehicle bodies for passenger vehicles, including the associated supporting structure, are manufactured from sheet-metal parts. The bearer members which have hollow profiles are formed by welding together two deep-drawn metal sheets or stampings. The bearer joints which form the connection of two bearers are typically formed by overlapping adjoining bearer ends and joining them at the points of contact with a weld seam or several spot welds.

The steel sheets used to construct such self-supporting vehicle bodyworks are typically shaped in a deep drawing process. While the dies used for shaping the steel sheets are relatively expensive, they do provide a cost-favorable solution for mass production since they permit large production runs. However, in view of the high investment costs for tooling, the aforesaid process is very cost-intensive for smaller production runs.

A more cost-favorable solution for small production runs is known, for example, from European Patent document EP 0 146 716. This document discloses a vehicle body for a passenger car comprising a bearing structure assembled from a plurality of hollow section frame members which are joined together by nodes or junction elements. The hollow section frame members are formed as extruded light-alloy (aluminum) sections and the junction elements are formed as light-alloy castings. In addition to being a more cost-favorable solution for small production runs, a light-alloy bodywork of the type disclosed in EP 0 146 716 weighs less and is more resistant to corrosion than a sheet metal bodywork.

In the case of such a light-alloy bodywork, the front end longitudinal bearer assembly is assembled from bearer members of different profiles. The bearer members are joined by inserting an end of a first bearer member within a receiving end of a second bearer member or by placing them against one another in positive engagement after which they are then fixed in place by welding. A longitudinal bearer member joint is subject to very high loads, particularly during frontal impact. Accordingly, this joint is designed with suitably large dimensions to ensure adequate rigidity and strength.

German patent document DE 38 11 427 discloses a contact joint for connecting two axially aligned hollow section longitudinal bearer members, each having the same polygonal cross-sectional profile, wherein the adjoining end of one bearer member is notched for fitted insertion within the receiving adjoining end of the other bearer member. Adhesive is applied to the notched surfaces prior to insertion. A disadvantage here, however, is that only longitudinal bearer members of the same cross-sectional profile may be joined by such a technique.

French patent document FR 775 182 discloses a sheet metal clam shell junction element for connecting the ends of four tubular longitudinal members at right angles to one another. The clam shell junction element comprises a top and bottom half shell portions. When assembled, the top and bottom half shell portions fully enclose the adjoining bearer member ends and are welded together at mating edges thereof. The resulting weld seam is disposed in a horizontal plane at the approximate middle of the assembly and therefore lies disadvantageously in a zone subject to very high loads.

THE INVENTION

OBJECTS

It is therefore an object of the present invention to provide a simple and strong longitudinal bearer Joint assembly for joining the abutting ends of two axially aligned longitudinal bearer members in a front end bearer assembly of a vehicle bodywork which overcomes the problems of the prior art.

It is another object of the invention to provide a longitudinal bearer Joint assembly of the type described wherein the cross-sectional profiles of the longitudinal bearer members to be connected by the joint assembly are specially dimensioned to favorably control the extent of deformation to the front end bearer assembly during a frontal impact to facilitate simple and low cost repairs.

Other and further objects will become evident from the following written description, drawings and appended claims.

DRAWINGS

FIG. 1 is an exploded perspective view of a compound longitudinal bearer assembly showing a longitudinal bearer joint assembly constructed in accordance with one embodiment of the present invention.

SUMMARY

The invention concerns an improved longitudinal bearer joint assembly for connecting the abutting ends of two axially aligned longitudinal bearer members in a front end bearing assembly of a vehicle bodywork. The longitudinal bearer members are designed as light-metal (i.e. aluminum alloy) extruded sections and the joint assembly comprises a pair of shell portions designed as light-metal castings.

The cross-sectional profiles of the abutting longitudinal bearer members are selectively dimensioned such that the first or more forwardly disposed longitudinal bearer member is less rigid and is a weaker member in compression than the second or more rearwardly disposed bearer member. Such selective dimensioning of the two adjoining longitudinal members results a step change or transition of the cross-sectional profile dimension at the junction between the two longitudinal bearer members. That is, the second rearwardly disposed bearer members is generally larger in cross-section and has a greater wall thickness dimension than the first, forwardly disposed bearer member.

The interior surfaces of the half shell portions are matched to conformingly fit around the exterior surfaces of the longitudinal bearer members at the step change. The dividing line between the two half shell portions defining their mutual contact surfaces is oriented in a vertical plane.

The above described extruded light-metal compound longitudinal bearer assembly ensures that, in the event of a minor (i.e., low energy) frontal impact, only the first, more forwardly disposed (and less rigid) bearer member of the longitudinal bearer assembly will deform, while the second, rearwardly adjoining bearer member along with the other frame parts and units connected thereto will not suffer damage. As a result, collision damage to the front end is minimized so that for minor frontal collisions, it is usually only necessary to replace the first, more forwardly disposed bearer member during a repair.

The design of the longitudinal bearer joint via half shell portions is particularly well suited for connecting the adjoining ends of axially aligned bearer members of different cross-sectional profiles, since it is a simple matter to incorporate added wall thicknesses to the half shell portions where needed in the region of the step change to ensure adequate strength. Further, the design of the half shell portions as castings makes it simple to produce such matched wall thickness variations and profile transitions.

An inexpensive and suitable construction for such a compound longitudinal bearer assembly includes a first bearer member formed as a simple cylindrical tube and a second bearer member designed as an extruded-section bearer having a polygonal cross-section for higher stiffness.

In contrast to a longitudinal bearer joint which is formed as a single piece casting, there are no casting bevels in the seam region and no sliders or shims are required in the production process. Although here, as in an insertion joint, a complete connection is possible, the above-mentioned disadvantages associated with the use of insertion joints, and particularly the alignment and fitting problems associated with alignment and connection of the last bearer members, are not present, because the half shell portions can be attached horizontally to the direction of the bearer members. The overall result is a less complicated construction than the prior art.

Another advantage of the dual half shell Joint construction of the present invention, especially in comparison to insert joints, is that tolerances in the half shell portions can be better reconciled.

In a longitudinal bearer assembly which comprises two axially adjoining bearer members, the least critical loading region lies in the vicinity of the vertical axial plane or the so called "neutral axis". Accordingly, the strength of the longitudinal bearer joint may be further increased by aligning the mutual contact surfaces of the two half shell portions in the vicinity of the neutral axis of the longitudinal bearer assembly. In this way, weld or adhesive bonding seams at the contact surfaces of the shell portions would be located in regions of the longitudinal bearer assembly which experience the least amount of loading forces and stress.

A further increase in strength of the longitudinal bearer joint assembly may be realized by offsetting the mutual contact surfaces of the half shell portions in the circumferential direction relative to the axially aligned and adjoining bearer members. In particular, offsetting the mutual contact surfaces of the half shell portions such that they lie on opposite sides of the neutral axis advantageously influences the force characteristic in the longitudinal bearer joint assembly.

Suitable joining techniques such as welding or adhesive bonding may be employed to secure the half shell portions to the longitudinal bearer members and to one another at their regions of mutual contact.

Depending upon the circumstances, material and weight savings may be realized by providing the half shell portions with openings or perforations. However, care must be used in the number and size of the openings so as not to compromise the strength of the resulting joint connection.

A positive engagement between the longitudinal bearer members can be produced in the axial direction by forming ribs or supports in the half shell castings. Such an axial positive engagement has a strength-increasing effect for a longitudinal-member arrangement comprising two axially aligned adjoining bearer members.

Further, where the half shell portions are formed as castings, they can be configured such that they are sufficiently strong to support additional members. For example, mountings or support struts may be formed integral with one or both of the half shell portions during the casting process.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a longitudinal bearer joint assembly 1 constructed in accordance with one embodiment of the present invention. The longitudinal bearer Joint assembly 1 shown represents one of a pair of longitudinal bearer joint assemblies typically located in the forward region of a passenger vehicle bodywork (not shown). The longitudinal bearer assembly 1 comprises a first, forwardly disposed bearer member 2 and a second, rearwardly disposed bearer member 3 axially adjoined thereto. The first bearer member 2 is a cylindrical tube comprised of an aluminum alloy. The second bearer member 3 is an extruded section designed as a hollow section, and is likewise comprised of an aluminum alloy. The second bearer member 3 preferably has a somewhat larger cross-sectional profile than the first bearer member and is polygonal in cross-section with straight external surface portions. The first bearer member 2 is designed to be less stiff than the second bearer member 3 such that only the first bearer member 2 will experience deformation during a low energy frontal impact such that the second bearer member along with other frame elements connected thereto remains undeformed.

The first bearer member 2 and the second bearer member 3 are aligned with one another along a common longitudinal axis A—A and abut one another at their respective end regions 5 and 6.

The abutting ends 5 and 6 of bearer members 2 and 3 are secured in place by a clam shell-type joint enclosure comprising of a first half shell portion 7 and a second half shell portion 8.

The two half shell portions 7 and 8 include semi-annular contact surfaces 9 and 10 at their forwardly disposed ends which, when brought together, surround and positively grip the cylindrical end region 5 of the first bearer member 2. In addition, vertical contact surfaces 9a and 9b of the half shell portion 7 matingly engage the coordinately aligned vertical contact surfaces 10a and 10b of half shell portion 8.

Similarly, at the rearwardly disposed ends of the half shell portions 7 and 8, that is in an area which points towards the middle of the vehicle or towards the second, rearwardly disposed bearer member 3, each half shell portion 7, 8 contains inner contact surfaces 12 and 13, respectively, which are shaped to conformingly and positively grip the end region 6 of the second bearer member 3 when the shell parts 7 and 8 are assembled. In this area too, vertical parting faces 14a and 14b of half shell portion 7 rest against coordinate vertical parting faces 15a and 15b of half shell portion 8. As is clearly seen in FIG. 1, the vertical parting faces 9a, 9b and 14b do not lie in one axial vertical plane but are preferably offset relative to one another in the circumferential direction.

The second half shell portion 8 is provided with a bottom plate 15 which extends beneath a bottom flat wall of the bearer member 8 and includes a terminal end 15a which rests against contact surface 12 of the first half shell portion 7.

Additional support members may be formed integral with one or both of the cast light metal half shell portions 7 and 8 during the casting process. For example, a connecting support member 16, which represents a spring-strut mounting, is shown formed integral with the second half shell portion 8.

To reduce weight and material, one or both half shell portions 7 and 8 may contain openings or perforations in non-critical regions. For example, such an opening 17 is provided in a central area of the side wall of the second half shell portion 8. One or more axial ribs 11 (in phantom) may be provided to the inner walls of the half shell portions 7, 8 to promote a positive engagement between the longitudinal bearer members.

The bearer arrangement shown is assembled as follows:

The two bearer members 2 and 3 are placed against one another in axial alignment by their abutting end regions 5 and 6. The half shell portions 7 and 8 are then fitted around the adjoining end regions 5 and 6. The half shell portions 7 and 8 are then welded together at their mutually contacting surfaces. At the same time, the accessible outer rims of each contact surface are welded to the exterior surface of the adjacent bearer member. Alternatively, an adhesive bonding technique may be employed to secure the mating contact surfaces of each half shell portions 7 and 8 and the bearer member contact surfaces to their respective bearer members 7 and 8. The resulting connection provides a strong and positive locking longitudinal bearer joint at the step transition between two bearer members of different cross-sectional profiles.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A longitudinal bearer joint assembly in a front end bearing structure of a motor vehicle bodywork comprising in operative combination:
   a) a longitudinal bearer assembly including:
      i) a first extruded light metal bearer member of a first cross sectional profile and having a front end and a rear end;
      ii) a second extruded light metal bearer member of a second cross sectional profile and having a front end and a rear end;
      iii) said second bearer member is disposed axially aligned with and behind said first bearer member with said second bearer member front end in abutment with said first bearer member rear end;
      iv) said second cross sectional profile is greater than said first cross sectional profile such that said second bearer member is stiffer in compression than said first bearer member and there is a step change in profile dimension at the region of abutment between said first and second bearer members;
   b) a joint assembly for joining said first and second bearer members at said step change, said joint assembly includes:
      i) a pair of matingly engagable cast light metal half shell portions each having vertically oriented mutual contact surfaces;
      ii) each of said half shell portions having a concave inner surface which conforms to exterior surfaces of said first and second bearer members at said step change; and
      iii) at least one of said half shell portions includes an integral support member extending from an exterior surface thereof, said support member for attachment with other frame elements; and
   c) means for securing said half shell portion to said first and second bearer members and to each other adjacent said mutual contact surfaces.

2. A longitudinal bearer joint assembly as in claim 1 wherein at least one of said half shell portions includes a central opening in a side wall thereof.

3. A longitudinal bearer joint assembly as in claim 1 wherein:
   a) said first cross sectional profile of said first bearer member defines a generally cylindrical tube; and
   b) said second cross sectional profile of said second bearer member defines a polygonal tube.

4. A longitudinal bearer joint assembly as in claim 1 wherein at least one of said half shall portions includes at least one rib member disposed along the corresponding concave inner surface thereof to facilitate a positive axial engagement between said first and second bearer members.

5. A longitudinal bearer joint assembly as in claim 1 wherein said securing means comprises weld connections.

6. A longitudinal bearer joint assembly as in claim 1 wherein said securing means comprises glue adhesive connections.

7. A longitudinal bearer joint assembly as in claim 1 wherein:
   a) said vertically oriented mutual contact surfaces of said half shell portions are mutually offset about a neutral axis of said longitudinal bearer assembly.

8. A longitudinal bearer joint assembly as in claim 7 wherein at least one of said half shell portions includes a central opening in a side wall thereof.

9. A longitudinal bearer joint assembly as in claim 8 wherein:
   a) said first cross sectional profile of said first bearer member defines a generally cylindrical tube; and
   b) said second cross sectional profile of said second bearer member defines a polygonal tube.

10. A longitudinal bearer joint assembly as in claim 9 wherein at least one of said half shall portions includes at least one rib member disposed along the corresponding concave inner surface thereof to facilitate a positive axial engagement between said first and second bearer members.

11. A longitudinal bearer joint assembly as in claim 10 wherein said securing means comprises weld connections.

12. A longitudinal bearer joint assembly as in claim 10 wherein said securing means comprises glue adhesive connections.

13. A longitudinal bearer joint assembly as in claim 7 wherein:
   a) said first cross sectional profile of said first bearer member defines a generally cylindrical tube; and
   b) said second cross sectional profile of said second bearer member defines a polygonal tube.

14. A longitudinal bearer joint assembly as in claim 13 wherein at least one of said half shell portions includes at least one rib member disposed along the corresponding concave inner surface thereof to facilitate a positive axial engagement between said first and second bearer members.

15. A longitudinal bearer joint assembly as in claim 14 wherein said securing means comprises weld connections.

16. A longitudinal bearer joint assembly as in claim 14 wherein said securing means comprises glue adhesive connections.

17. A longitudinal bearer joint assembly as in claim 14 wherein at least one of said half shall portions includes at least one rib member disposed along the corresponding concave inner surface thereof to facilitate a positive axial engagement between said first and second bearer members.

* * * * *